(12) United States Patent
Inoue (10) Patent No.: US 10,010,939 B2
(45) Date of Patent: Jul. 3, 2018

(54) CUTTING INSERT, CUTTING TOOL, AND METHOD FOR MANUFACTURING MACHINED PRODUCT

(71) Applicant: KYOCERA Corporation, Kyoto-shi, Kyoto (JP)

(72) Inventor: Yoshihiro Inoue, Omihachiman (JP)

(73) Assignee: KYOCERA CORPORATION, Kyoto (JP)

( * ) Notice: Subject to any disclaimer, the term of this patent is extended or adjusted under 35 U.S.C. 154(b) by 5 days.

(21) Appl. No.: 15/312,981

(22) PCT Filed: May 22, 2015

(86) PCT No.: PCT/JP2015/064787
§ 371 (c)(1),
(2) Date: Nov. 21, 2016

(87) PCT Pub. No.: WO2015/178488
PCT Pub. Date: Nov. 26, 2015

(65) Prior Publication Data
US 2017/0157678 A1 Jun. 8, 2017

(30) Foreign Application Priority Data
May 22, 2014 (JP) .................................. 2014-106179

(51) Int. Cl.
*B23B 27/04* (2006.01)
*B23B 27/14* (2006.01)
*B23B 27/22* (2006.01)

(52) U.S. Cl.
CPC .............. *B23B 27/04* (2013.01); *B23B 27/14* (2013.01); *B23B 27/22* (2013.01); *B23B 27/045* (2013.01)

(58) Field of Classification Search
CPC ....... B23B 27/04; B23B 27/045; B23B 27/14; B23B 27/16; B23B 27/1607;
(Continued)

(56) References Cited
U.S. PATENT DOCUMENTS 2,891,300 A * 6/1959 Shephard ................ B23B 27/08
407/114
3,320,653 A * 5/1967 Shephard ................ B23B 27/08
407/116
(Continued)

FOREIGN PATENT DOCUMENTS

EP 312223 A1 * 4/1989 ............. B23B 27/04
EP 257002 A2 * 2/1998 ............. B23B 27/45
JP 2001-212704 A 8/2001

OTHER PUBLICATIONS

International Search Report (Form PCT/ISA/210) issued for PCT/JP2015/064787, dated Aug. 4, 2015.
(Continued)

*Primary Examiner* — Ryan Rufo
(74) *Attorney, Agent, or Firm* — Volpe and Koenig, P.C.

(57) ABSTRACT

A cutting insert of one aspect includes a main body section and a cutting section located at least at the front end side of the main body section, wherein the cutting section includes a top surface and a front cutting edge disposed along a ridge line at an intersection between the top surface and a front side surface, the front cutting edge includes a first section, a second section, and a third section, and a portion of the second section is located above the first section and the third section.
The front side surface includes a first region located below the first section, a second region located below the second site, and a third regions located below the third site, wherein
(Continued)

an angle of inclination of the second region is greater than angles of inclination of the first region and the third region.

9 Claims, 11 Drawing Sheets

(58) Field of Classification Search
CPC . B23B 27/1625; B23B 27/1637; B23B 27/22; B23B 29/043; Y10T 407/25
See application file for complete search history.

(56) References Cited

U.S. PATENT DOCUMENTS

| | | | | |
|---|---|---|---|---|
| 3,520,041 | A * | 7/1970 | Shephard | B23B 27/08 407/115 |
| 6,447,219 | B1 * | 9/2002 | Tagtstrom | B23B 27/06 407/110 |
| 2001/0014259 | A1 | 8/2001 | Inayama | |
| 2005/0123367 | A1 * | 6/2005 | Gati | B23B 27/005 407/113 |
| 2007/0059112 | A1 * | 3/2007 | Nudelman | B23B 27/045 407/117 |

OTHER PUBLICATIONS

Written Opinion (Form PCT/ISA/237) issued for PCT/JP2015/064787, dated Aug. 4, 2015.

* cited by examiner

CUTTING INSERT, CUTTING TOOL, AND METHOD FOR MANUFACTURING MACHINED PRODUCT

TECHNICAL FIELD

The present embodiment relates to a cutting insert, a cutting tool, and a method for manufacturing a machined product.

BACKGROUND ART

Conventionally, the tip (cutting insert) described in Japanese Unexamined Patent Application Publication No. 2001-212704A (Patent Document 1) has been known as a cutting insert used in grooving of a work material. In the tip described in Patent Document 1, a front cutting edge is formed along a ridge line of a rake surface (top surface) and a front relief surface (front side surface). At substantially the center of the cutting edge ridge of the front cutting edge, a recess portion is disposed and lowers the rake surface, and a recessed groove extending successively rearward from the recess portion is disposed on the rake surface.

The front side surface on the tip described in Patent Document 1 is inclined rearward as it goes downward due to the fact that it is a relief surface. For this reason, the recess portion is formed recessing downward in a front end view, and formed recessing rearward in a top view. As a result, in grooving of a work material, an unmachined portion may be left at the groove bottom which is the machined surface, and smoothness of the groove bottom decreases.

In light of the problems described above, an object of the present aspect is to provide a cutting insert that can form a groove bottom with good machining precision, a cutting tool, and a method for manufacturing a machined product.

SUMMARY OF INVENTION

A cutting insert according to one aspect includes a main body section elongated in a direction from a rear end side toward a front end side, and a cutting section located at least at the front end side of the main body section. The cutting section includes a top surface, a front side surface adjacent to the top surface on the front end side and inclined toward the rear end side as a distance from the top surface increases, and a front cutting edge disposed along a ridge line at an intersection between the top surface and the front side surface.

The front cutting edge includes a first section, a pair of second sections sandwiching the first section therebetween, and third sections sandwiching the first section and the pair of second sections therebetween. A portion of the pair of second sections is located above the first section and the pair of third sections. The front side surface includes a first region located below the first section, a pair of second regions located below the pair of second sections, and a pair of third regions located below the pair of third sections. An inclination angle of the pair of second regions is greater than an inclination angle of the first region and an inclination angle of the third regions.

DESCRIPTION OF EMBODIMENTS

Cutting Insert

A detailed description will be given below of a cutting insert 1 of an embodiment (referred to below simply as "the insert 1") using the drawings. However, for convenience of explanation, each of the drawings referenced below is simplified to illustrate only the main members necessary to describe the embodiment. Accordingly, the cutting insert of the present invention may be provided with any constituent member which is not illustrated in each of the referenced drawings. Further, the dimensions of the members in the drawings do not faithfully represent the actual dimensions of the constituent members, the dimension ratios of the members, or the like.

As illustrated in FIGS. 1 to 11, an insert 1 of the present embodiment includes one main body section 3 and two cutting sections 5. The main body section 3 has a rod shape elongated in a straight line from one side toward the other side. Furthermore, when one end of the rod-shaped main body section 3 is used as a front end, and the other end of the rod-shaped main body section 3 is used as a rear end, a central axis O extends from the rear end toward the front end on the main body section 3. For this reason, the main body section 3 is said to elongate along the central axis O.

The main body section 3 includes a top side surface 7 located on a top side and that contacts a holder, and a bottom side surface 9 located on a bottom side and that contacts the holder. A top side groove portion 7a extending in a direction along the central axis O is formed in the top side surface 7. Furthermore, a bottom side groove portion (not illustrated) extending in the direction along the central axis O is formed in the same manner in the bottom side surface 9. The insert 1 can be stably secured in the holder due to the insert 1 being provided with the top side groove portion 7a and the bottom side groove portion and, as described later, also due to the holder being provided with a first protrusion that contacts the top side groove portion and a second protrusion that contacts the bottom side groove portion.

The size of the main body section 3 is not particularly limited but may, for example, be set so that a length along the central axis O is approximately from 5 to 80 mm. Additionally, a width in a direction orthogonal to the central axis O in a top view (horizontal direction in FIG. 2) may be set to, for example, approximately from 2 to 20 mm. Additionally, a height in a direction orthogonal to the central axis O in a side view (vertical direction in FIG. 5) may be set to, for example, approximately from 2 to 15 mm.

One cutting section 5 may be located at least at the front end side of the main body section 3. In the present embodiment, one cutting section 5 is located at the front end side of the main body section 3 and another cutting section 5 is located at the rear end side of the main body section 3. The main body section 3 and the cutting section 5 may be formed separately or integrally. In the insert 1 of the present embodiment, the main body section 3 and the cutting section 5 are formed integrally. Furthermore, a groove portion corresponding to the bottom side groove portion in the main body section 3 is formed on the bottom surface of the cutting section 5 in the present embodiment.

Examples of the material of the member constituting the insert 1 include cemented carbide alloy, cermet, or the like. Examples of the composition of the cemented carbide alloy include, for example, WC—Co, WC—TiC—Co, and WC—TiC—TaC—Co. WC—Co is produced by adding a cobalt (Co) powder to tungsten carbide (WC), and sintering the mixture. WC—TiC—Co is formed by adding titanium carbide (TiC) to WC—Co. WC—TiC—TaC—Co is formed by adding tantalum carbide (TaC) to WC—TiC—Co.

Further, cermet is a sintered composite material obtained by combining a metal with a ceramic component. Specifically, examples of the cermet include compounds in which a titanium compound such as titanium carbide (TiC), or titanium nitride (TiN) is the main component.

The surface of the member described above constituting the insert 1 may be coated with a coating film using a chemical vapor deposition (CVD) method or a physical vapor deposition (PVD) method. Examples of the composition of the coating film include titanium carbide (TiC), titanium nitride (TiN), titanium carbonitride (TiCN), alumina ($Al_2O_3$), and the like.

When performing machining using the insert 1 of the present embodiment, one of the two cutting sections 5 is used. In cases where the cutting section 5 located at the rear end side of the main body section 3 is used, the front end side and the rear end side of the main body section 3 are reversed and the insert 1 is attached to the holder. The cutting section 5 located at the front end side of the main body section 3 and the cutting section 5 located at the rear end side of the main body section 3 have the same shape. As such, in the following, a case where the cutting section 5 is located at the front of the main body section 3 will be described.

The cutting section 5 is provided with a top surface 11, a bottom surface 13, side surfaces, and cutting edges. As the side surfaces, a front side surface 15, lateral side surfaces 17, and corner side surfaces 19 are provided. As the cutting edges, a front cutting edge 21, lateral cutting edges 23, and corner cutting edges 25 are provided. Note that the lateral cutting edges 23 and the corner cutting edges 25 are optional.

The top surface 11 and the bottom surface 13 each extend from the rear end side to the front end side. The shape of the top surface 11 is roughly rectangular in a top view. The top surface 11 functions as a rake surface when cutting a work material. Of the outer periphery of the top surface 11, the cutting section 5 is contiguous with the main body section 3 at the short edge located on the rear end side. Although not particularly illustrated, the shape of the bottom surface 13 is roughly rectangular, similar to the top surface 11 in a bottom view.

Of the side surfaces located between the top surface 11 and the bottom surface 13, the front side surface 15 is a portion located at the front end side. Accordingly, the front side surface 15 is adjacent to the top surface 11 at the front end side of the cutting section 5. The front side surface 15 has a substantially quadrilateral shape in a front end view. A pair of lateral side surfaces 17 is located at a portion of the side surfaces adjacent to the front side surface 15. Each of the pair of lateral side surfaces 17 extends from the rear end side to the front end side. The front side surface 15 and the lateral side surfaces 17 are substantially orthogonal to each other, and corner side surfaces 19 are located between the front side surface 15 and the lateral side surfaces 17. Since the front side surface 15 and the lateral side surfaces 17 connect smoothly, the corner side surfaces 19 have a curved surface shape.

In the insert 1 of the present embodiment, the central axis O is located passing through the center of the front side surface 15 of each of the two cutting sections 5. The front side surface 15 has a substantially quadrilateral shape in a front end view, and the center portion in the height direction of the front side surface 15 and the center portion in the width direction serve as the center portion of the front side surface 15. In the present embodiment, the intersection point of the diagonal lines on the front side surface 15 is also called the center portion of the front side surface 15. Furthermore, in the present specification, "in a front end view" means viewing a side surface from the front end side where the front side surface is located.

The front side surface 15, the lateral side surfaces 17, and the corner side surfaces 19 each function as relief surfaces when cutting the work material. As such, the front side surface 15, the lateral side surfaces 17, and the corner side surfaces 19 each are directed toward the inside of the cutting section 5, from the side of the top surface 11 toward the side of the bottom surface 13 in a side view. In other words, the front side surface 15 is inclined toward the rear end side as a distance from the top surface 11 increases. For example, in FIG. 4, the front side surface 15 located on the left end which is the front end side is inclined toward the right side which is the rear end side, from the top surface 11 side to the bottom surface 13 side.

Additionally, as the side surfaces are configured as described above, the bottom surface 13 is slightly smaller in size compared to the top surface 11. A size of the cutting section 5 is not particularly limited but, for example, is set so that a length along the central axis O is approximately from 3 to 20 mm.

A front cutting edge 21 is disposed along a ridge line at an intersection between the top surface 11 and the front side surface 15. Lateral cutting edges 23 are disposed along ridge lines at intersections between the top surface 11 and the lateral side surfaces 17. Corner cutting edges 25 are disposed along ridge lines at intersections between the top surface 11 and the corner side surfaces 19. When performing machining using the insert 1 of the present embodiment, the front cutting edge 21 is mainly used, and the lateral cutting edges 23 and the corner cutting edges 25 are also used as necessary. The work material is cut by these cutting edges.

In this case, the ridge lines where each of the front side surface 15, the lateral side surfaces 17, and the corner side surfaces 19 intersect with the top surface 11 do not have a strict linear shape due to the fact that two faces intersect. When the acute angles of the ridge lines where the side surfaces intersect with the top surface 11 are sharp, the durability of the cutting edge may degrade. As such, the portions where the top surface 11 and the side surfaces described above intersect are subjected to a so-called honing process, and these portions have a slightly curved shape.

The front cutting edge 21 in the present embodiment extends in a direction roughly parallel to the bottom surface 13 and orthogonal to the central axis O. The corner cutting edges 25 are connected to the front cutting edge 21 and the lateral cutting edges 23, and the corner cutting edges 25 have an arc shape with the convex portion toward the outer side in a top view. The lateral cutting edges 23 have an ascending incline as the distance from the front cutting edge 21 and corner cutting edge 25 increases. In other words, the lateral cutting edges 23 are inclined upward from the front end side toward the rear end side. The lateral cutting edge 23 can decrease the generation of chatter vibration due to being inclined as described above.

Furthermore, as already shown, a groove portion is formed on the bottom surface 13 of the cutting section 5 in the present embodiment. For this reason, in the present embodiment, "parallel to the bottom surface 13" means parallel to an imaginary plane (strictly speaking, an imaginary line in a front end view) that joins the two ends of the groove portion in a front end view.

Figure 1:
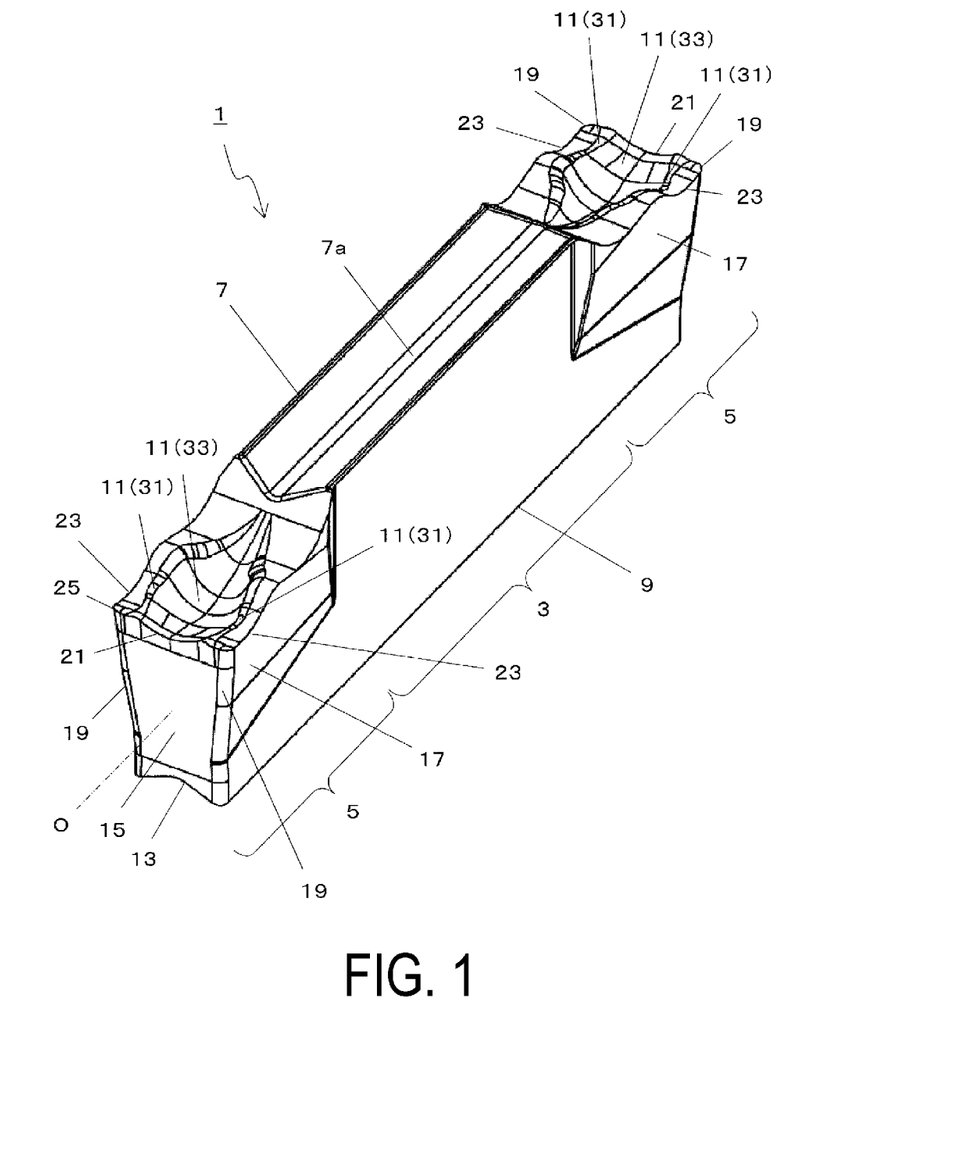
FIG. 1 is a perspective diagram illustrating a cutting insert of one embodiment of the present invention.
Figure 2:
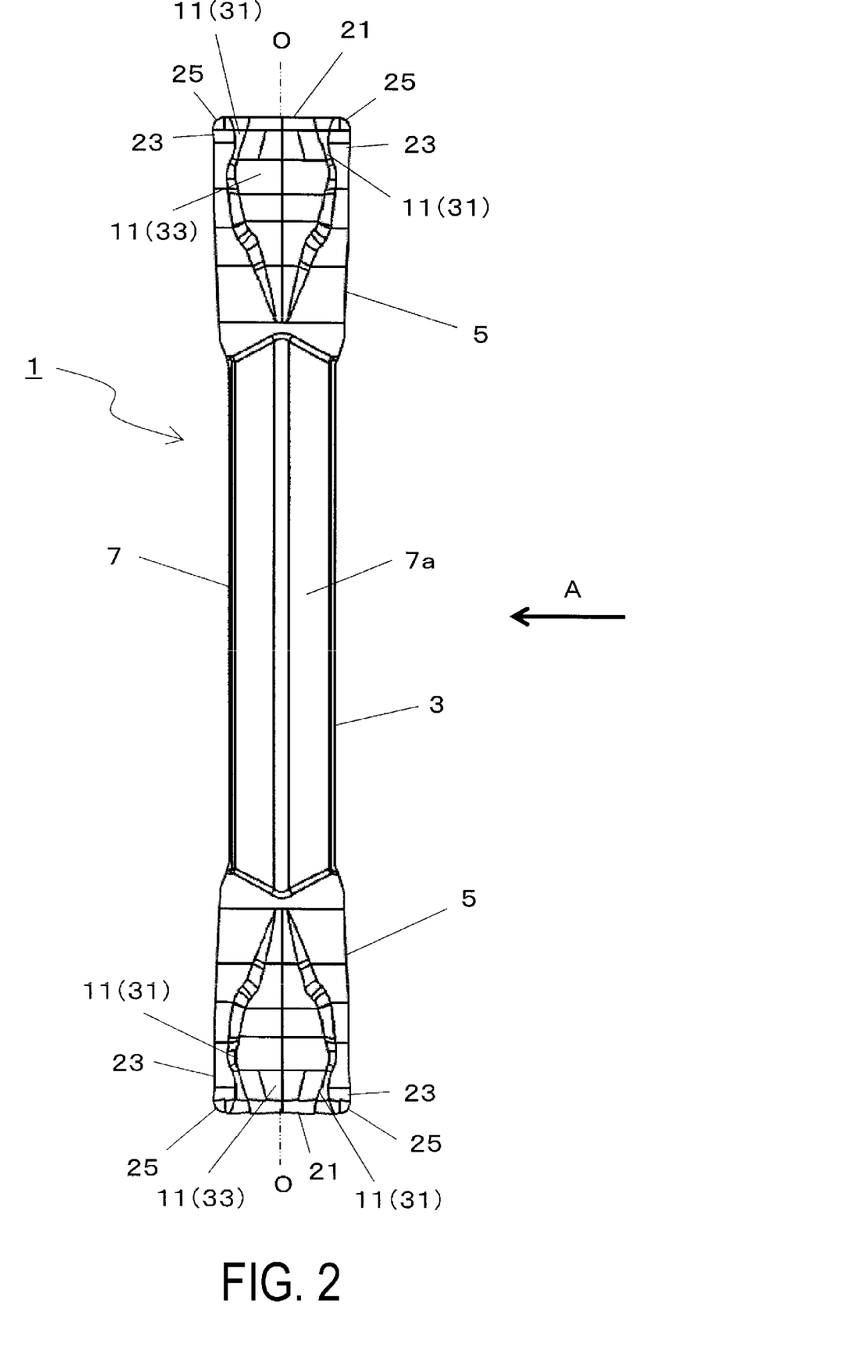
FIG. 2 is a top view of the cutting insert illustrated in FIG. 1.
Figure 3:
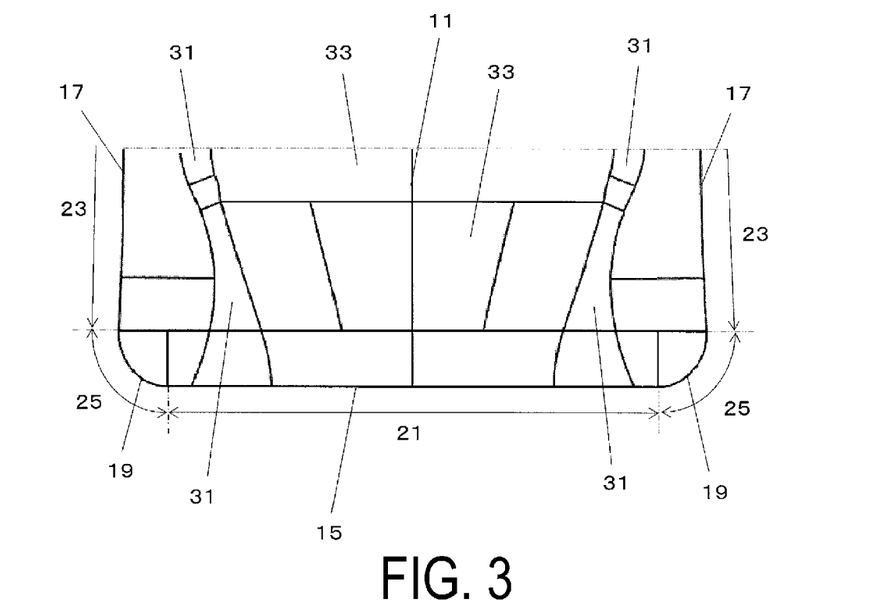
FIG. 3 is an enlarged top view of the vicinity of a front cutting edge of the cutting insert illustrated in FIG. 2.
Figure 4:
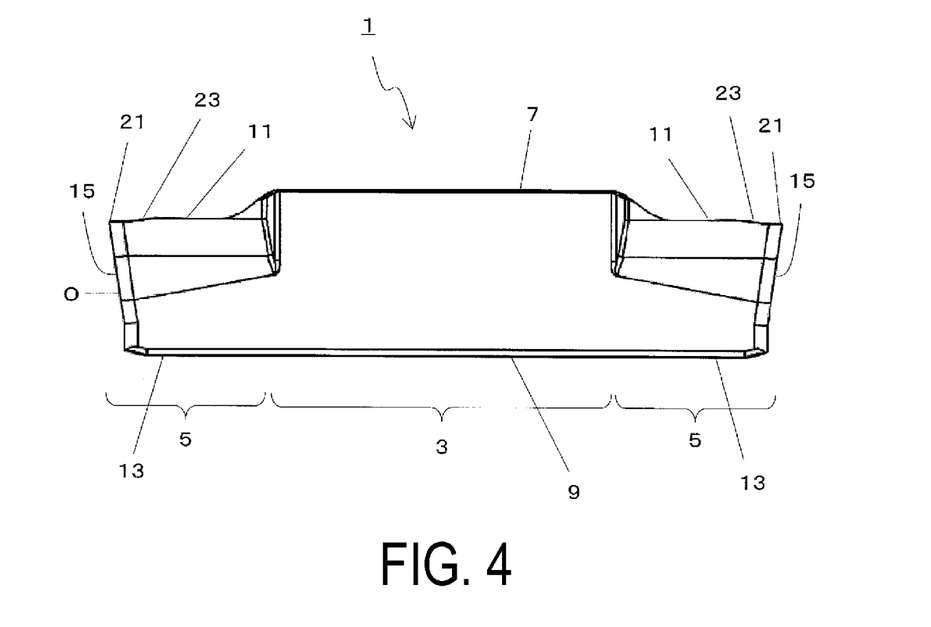
FIG. 4 is a side view of the cutting insert illustrated in FIG. 1 as viewed in an A direction.

The front cutting edge 21 has a roughly linear shape in a top view as illustrated in FIG. 3. On the other hand, the front cutting edge 21 has an M shape in a front end view as described below. The front cutting edge 21 includes a first section 21a, a pair of second sections 21b, and a pair of third sections 21c. The first section 21a in the present embodiment is located in the center of the front cutting edge 21 and includes the center of the front cutting edge 21. The pair of second sections 21b sandwiches the first section 21a therebetween. The pair of third sections 21c sandwiches the first section 21a and the pair of second sections 21b therebetween.

Figure 5:
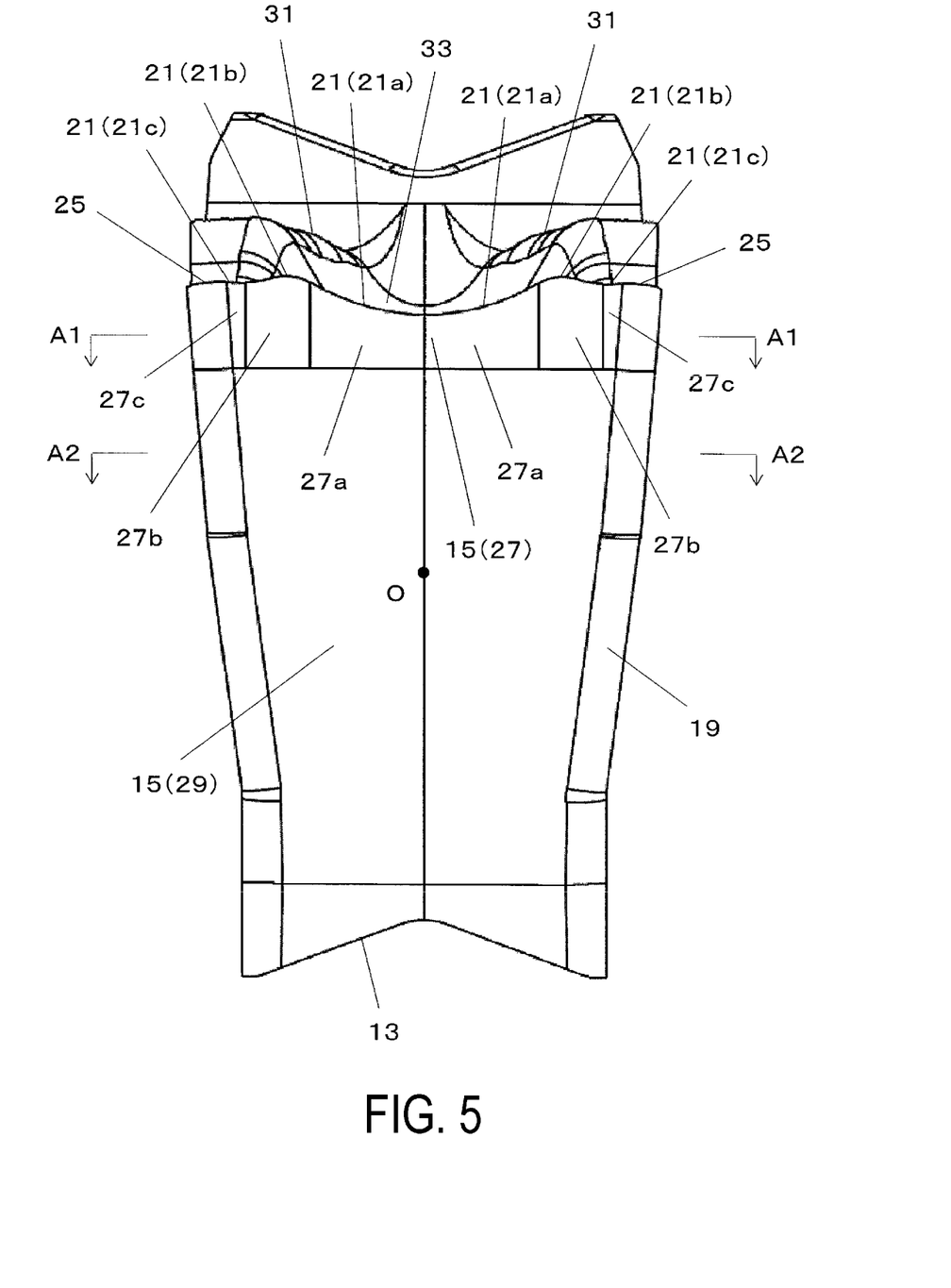
FIG. 5 is a view of the cutting insert illustrated in FIG. 1 in a front end view.
Figure 6:
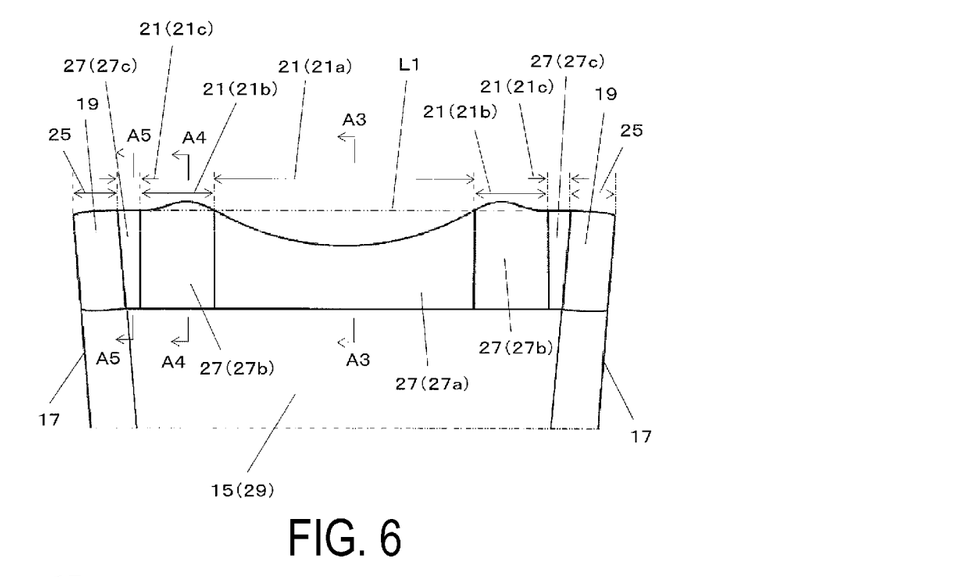
FIG. 6 is an enlarged view of the vicinity of the front cutting edge of the cutting insert illustrated in FIG. 5.

Here, a portion serving as the highest point of the pair of second sections 21b is located above the first section 21a and the pair of third sections 21c. For this reason, as illustrated in FIGS. 5 and 6, the front cutting edge 21 is formed in an M shape by the first section 21a, the second sections 21b and third sections 21c with the center and the two ends recessing downward.

In particular, in the present embodiment, when an imaginary line L1 is drawn joining the two ends of the front cutting edge 21, the first section 21a, second sections 21b, and third sections 21c are divided by the region where the imaginary line L and the front cutting edge 21 intersect in a front end view.

For this reason, in the present embodiment, the first section 21a is located below the imaginary line L1. The second sections 21b are located above the imaginary line L1. The third sections 21c are the regions between the second sections 21b and the end portion of the front cutting edge 21.

Furthermore, when the height of the front cutting edge 21 gradually decreases from the highest point of the pair of second sections 21b toward the end portion of the front cutting edge 21, one point of the end portion of the front cutting edge 21 corresponds to the third section 21c.

In the present embodiment, the first section 21a has a curved shape that curves downward in a front end view. For this reason, the first section 21a has a shape protruding downward. The pair of second sections 21b have curved shapes that each curve upward in a front end view. For this reason, the second sections 21b have shapes protruding upward. The pair of third sections 21c have curved shapes that each curve downward in a front end view. For this reason, the third sections 21c have shapes protruding downward.

As such, due to the first section 21a, second sections 21b, and third sections 21c having respective curved shapes, the load is less likely to being excessively concentrated at portions of the first section 21a, second sections 21b, and third sections 21c. Furthermore, due to the first section 21a, second sections 21b, and third sections 21c having respective curved shapes, the first section 21a and the second sections 21b are smoothly connected, and the second sections 21b and the third sections 21c are smoothly connected, even while the front cutting edge 21 has an M-shaped portion as described above. For this reason, the load is less likely to being excessively concentrated at the boundary between the first section 21a and second sections 21b and the boundary between the second sections 21b and third sections 21c.

The front side surface 15 in the present embodiment includes an upper region 27 located on a side of the top surface 11 and a lower region 29 located on a side of the bottom surface 13. The upper region 27 includes a first region 27a, second regions 27b, and third regions 27c. The first region 27a is located below the first section 21a on the front cutting edge 21. The second regions 27b are located below the second sections 21b on the front cutting edge 21. The third regions 27c are located below the third sections 21c on the front cutting edge 21.

The lower region 29 on the front side surface 15 has a flat planar shape. On the other hand, the upper region 27 on the front side surface 15 does not have a flat planar shape. Specifically, the first region 27a, the second regions 27b, and the third regions 27c in the upper region 27 are all inclined toward the rear end side as a distance from the top surface 11 increases, but the angles of inclination are not fixed.

Figure 9:
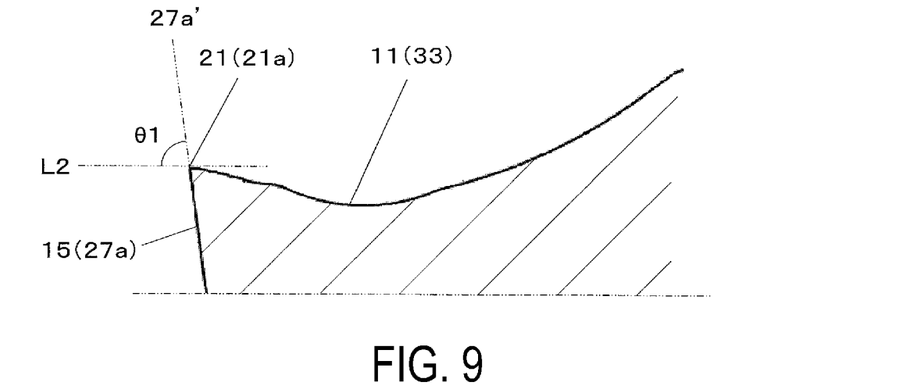
FIG. 9 is a cross-sectional view along a cross-section A3-A3 of the cutting insert illustrated in FIG. 6.

In the present embodiment, the inclination angle of the first region 27a is called the first inclination angle $\theta 1$, the inclination angle of the pair of second regions 27b is called the second inclination angle $\theta 2$, and the inclination angle of the pair of third regions is called the third inclination angle $\theta 3$. More specifically, as illustrated in FIG. 9, the first inclination angle $\theta 1$ is evaluated by the angle formed by an imaginary line L2 parallel to the central axis O on the lowest point of the first section 21a and an imaginary extended line 27a' of the first region 27a.

Figure 10:
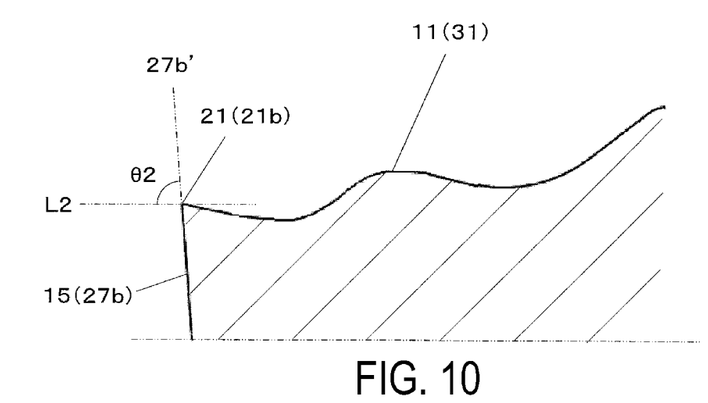
FIG. 10 is a cross-sectional view along a cross-section A4-A4 of the cutting insert illustrated in FIG. 6.
Figure 11:
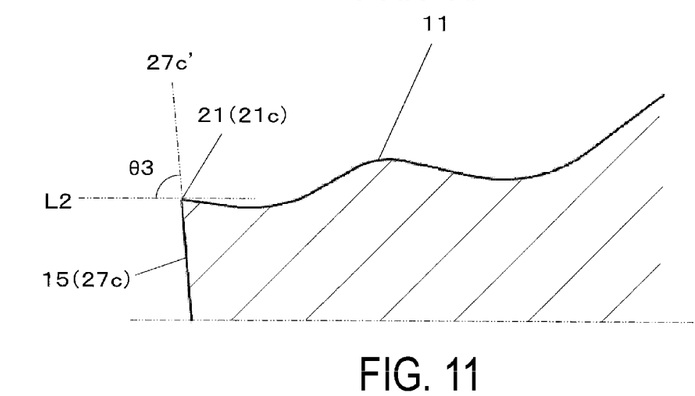
FIG. 11 is a cross-sectional view along a cross-section A5-A5 of the cutting insert illustrated in FIG. 6.

Furthermore, as illustrated in FIG. 10, the second inclination angle $\theta 2$ is evaluated by the angle formed by an imaginary line L2 parallel to the central axis O on the highest point of the second section 21b and an imaginary extended line 27b' of the second region 27b. As illustrated in FIG. 11, the third inclination angle $\theta 3$ is evaluated by the angle formed by an imaginary line L2 parallel to the central axis O on the lowest point of the third section 21c and an imaginary extended line of the third region 27c'.

Figure 12:
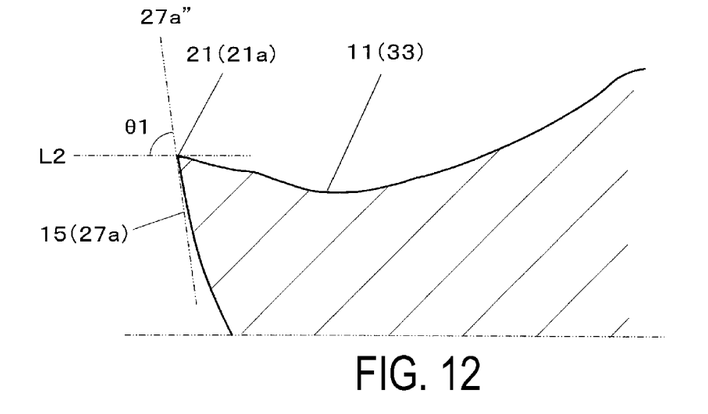
FIG. 12 is a cross-sectional view illustrating a modified example of the cutting insert illustrated in FIG. 9.

However, as illustrated in FIG. 12, when the first region 27a is not indicated by a straight line in cross-section, in other words, when the first inclination angle $\theta 1$ is not fixed, the first inclination angle $\theta 1$ may be evaluated by the angle formed by a tangent 27a" of the highest point of the first region 27a and an imaginary line L2 parallel to the central axis O. This is the same for the second inclination angle θ2 and the third inclination angle θ3.

In the present embodiment, the second inclination angle θ2 of the pair of second regions 27b is greater than the first inclination angle θ1 of the first region 27a. Furthermore, the second inclination angle θ2 described above is greater than the third inclination angle θ3 of the third regions 27c.

Figure 7:
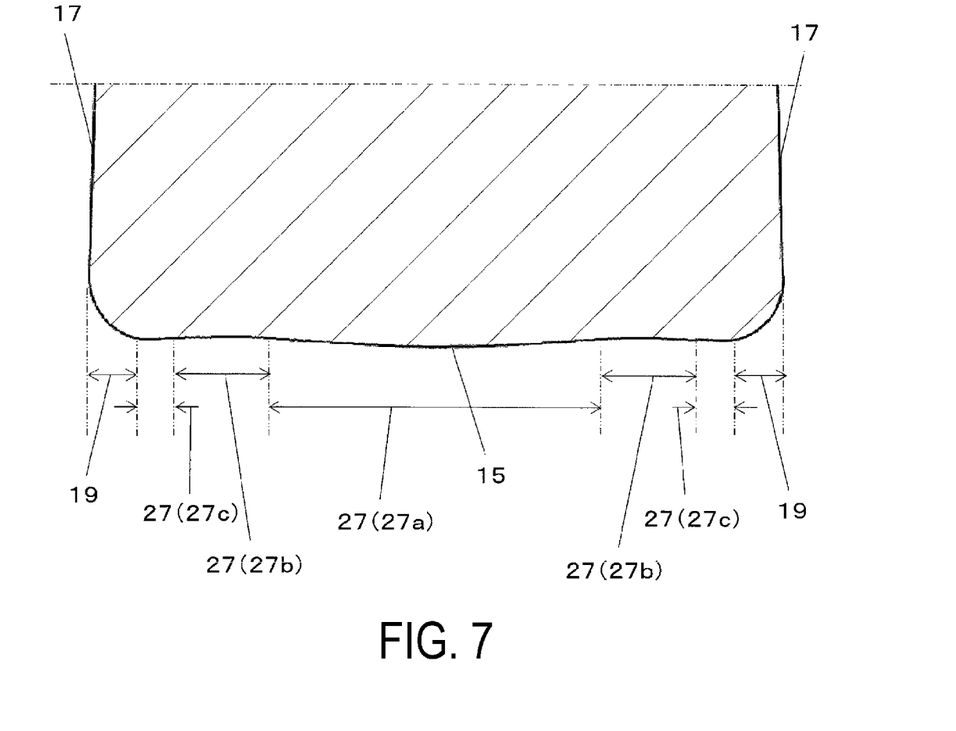
FIG. 7 is a cross-sectional view along a cross-section A1-A1 of the cutting insert illustrated in FIG. 5.
Figure 8:
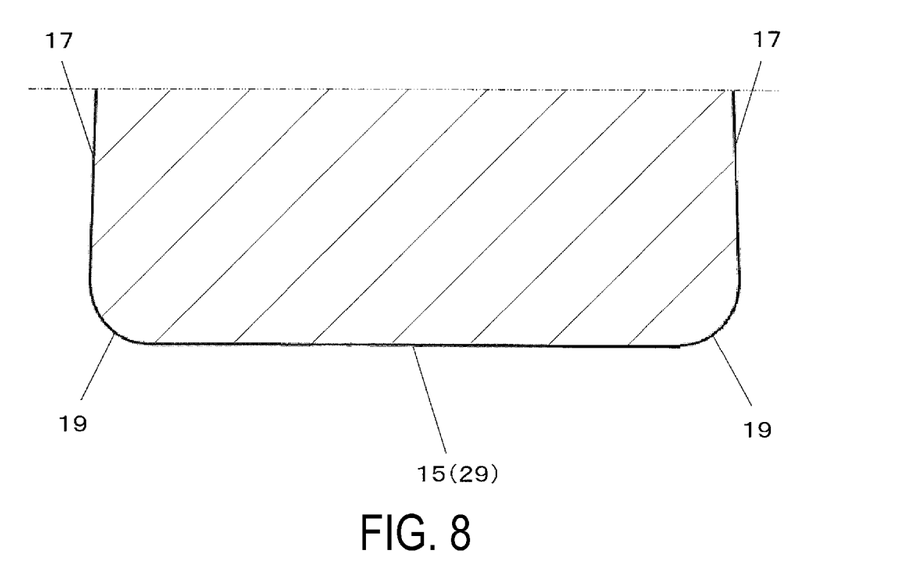
FIG. 8 is a cross-sectional view along a cross-section A2-A2 of the cutting insert illustrated in FIG. 5.

For this reason, as illustrated in FIG. 7, on the cross-section parallel to the bottom surface 13 passing through the upper region 27, the pair of second regions 27b are recessed and located more to the rear end side than the first region 27a and the third regions 27c. In other words, the first region 27a and the third regions 27c have a configuration that protrudes more to the front end side than the second regions 27b. On the other hand, since the lower region 29 has a flat planar shape, the lower region 29 is indicated by a linear shape in the cross-section parallel to the bottom surface 13 passing through the lower region 29, as illustrated in FIG. 8.

FIG. 7 is a cross-sectional view of a cross-section orthogonal to the vertical direction, which is a cross-section parallel to the bottom surface 13 indicated by line A1-A1 in FIG. 5. Furthermore, FIG. 8 is a cross-sectional view of a cross-section orthogonal to the vertical direction, which is a cross-section parallel to the bottom surface 13 indicated by line A2-A2 in FIG. 5. FIG. 9 is a cross-sectional view of a cross-section orthogonal to the first section 21a in a top view, which is indicated by line A3-A3 in FIG. 6. Furthermore, FIG. 10 is a cross-section orthogonal to the second sections 21b in a top view, which is indicated by line A4-A4 in FIG. 6.

When the front cutting edge 21 has an M-shaped portion as described above, and the inclination angles of the regions connected to the front cutting edge 21 on the front side surface 15 are fixed, the front cutting edge 21 has a shape in which the first section 21a and the third sections 21c of the front cutting edge 21 are recessed rearward in a top view. For this reason, in grooving of a work material, smoothness of the groove bottom decreases.

However, in the present embodiment, the front side surface 15 has a first region 27a, second regions 27b, and third regions 27c, all having mutually different inclination angles as described above. For this reason, the cutting edge 21 can be curved in a front end view, while on the other hand, the recesses described above can be reduced and the front cutting edge 21 can be closer to a linear shape. For this reason, a groove bottom can be formed with high machining precision while the cutting insert has good cutting strength.

The front cutting edge 21 in the present embodiment has a curved shape in which the first section 21a, the second sections 21b, and the third sections 21c each curve in a front end view. For this reason, the first region 27a, the second regions 27b, and the third regions 27c on the front side surface 15 do not have flat planar face shapes. Specifically, the first region 27a has a concave surface shape that recesses toward the rear end side and upward. The third regions 27c have a concave surface shape that recesses toward the rear end side and upward. Furthermore, the second regions 27b have a convex surface shape that protrudes toward the front end side and downward, the opposite of the first region 27a and the third regions 27c.

The front cutting edge 21 in the present embodiment has a curved shape in which the first section 21a, the second sections 21b, and the third sections 21c each curve in a front end view. For this reason, the first inclination angle θ1 gradually becomes greater from the lowest point of the first section 21a toward the second sections 21b. The second inclination angles θ2 gradually each become smaller from the highest point of the second section 21b toward the first section 21a and the third sections 21c. Furthermore, the third inclination angle θ3 gradually becomes greater from the lowest point of the third sections 21c toward the second sections 21b. Due to the front cutting edge 21 having these configurations, the shape of the front cutting edge 21 in a top view can be closer to a linear shape.

The lowest point of the first section 21a on the front cutting edge 21 in the present embodiment is located below the third sections 21c. As a result, the depth in the vertical direction of the concave portion constituted by the first section 21a and the second sections 21b can be maintained at a high depth. For this reason, chips produced at the pair of third sections 21c are drawn easily by the chips produced at the concave portion on the front cutting edge 21. This reduces the possibility of the chips contacting the side surface of the groove, which is one of the machined surfaces in grooving.

Here, the third inclination angle θ3 of the pair of third regions 27c becomes greater than the first inclination angle θ1 of the first region 27a because the front cutting edge 21 is close to a linear shape in a top view while the lowest point of the first section 21a is located below the third section 21c.

Furthermore, in order for the chips produced at the pair of second sections 21b to be easily drawn by the chips produced at the first section 21a, the top surface 11 includes a pair of projecting portions 31 and a recess portion 33. In the present embodiment, the pair of projecting portions 31 extends from the pair of second sections 21b on the front cutting edge 21 toward the rear end side. Furthermore, the recess portion 33 is located between the pair of projecting portions 31, and extends from the first section 21a on the front cutting edge 21 toward the rear end side.

Furthermore, in order for the chips produced at the pair of second sections 21b to be easily drawn by the chips produced at the first section 21a, the width of the first section 21a in the direction orthogonal to the vertical direction (horizontal direction in FIG. 5) is greater than the respective widths of the pair of second sections 21b.

Additionally, in order for the chips produced at the pair of third sections 21c to be easily drawn by the chips produced at the pair of second sections 21b, the width of the pair of the second sections 21b in the direction orthogonal to the vertical direction (horizontal direction in FIG. 5) is greater than the width of the pair of third sections 21c.

The size of the first inclination angle θ1 is set to, for example, approximately 75 to 87°. The size of the second inclination angle θ2 is set to, for example, approximately 77 to 89°. Furthermore, the size of the second inclination angle θ3 is set to, for example, approximately 76 to 88°.

Cutting Tool

Next, description will be given of a cutting tool 101 of an embodiment of the present invention using the drawings.

Figure 13:
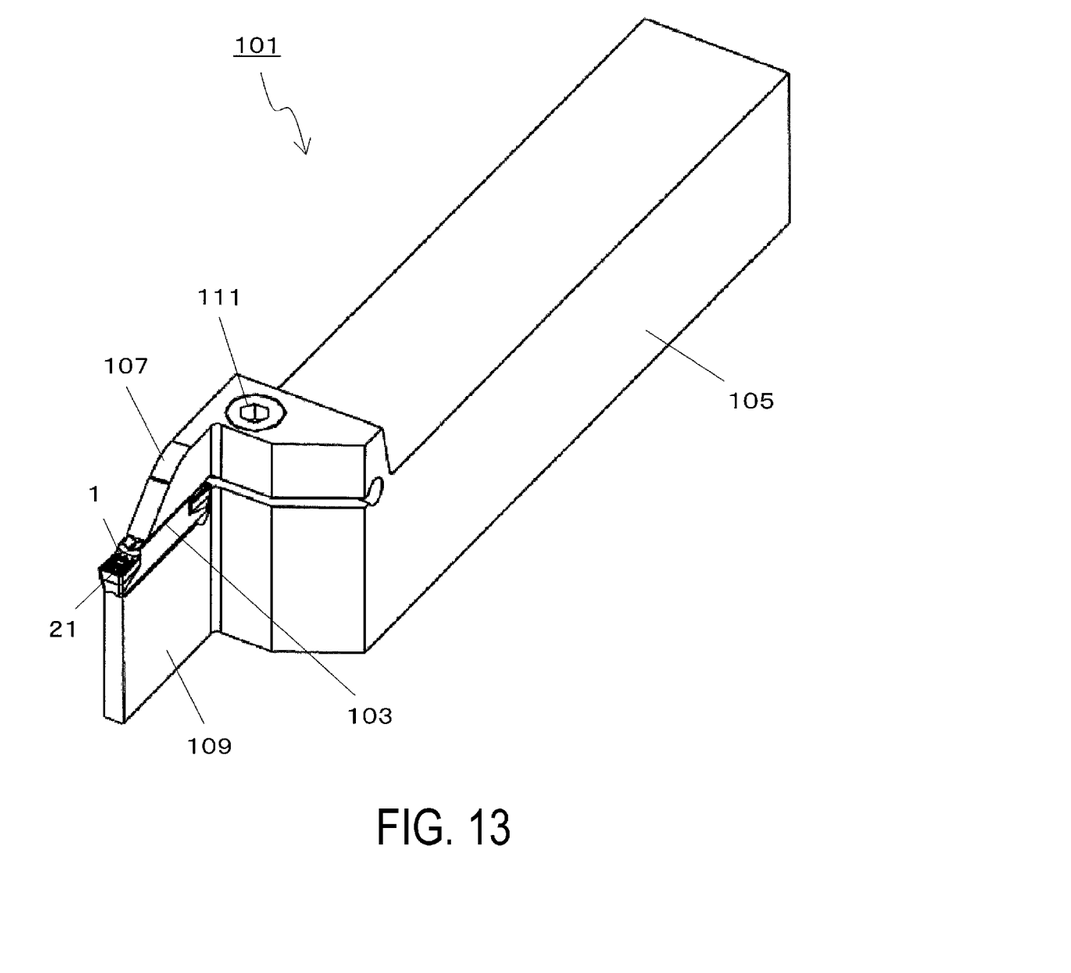
FIG. 13 is a perspective view illustrating a cutting tool of one embodiment of the present invention.

The cutting tool 101 in the present embodiment is provided with a holder 105 and the above-described cutting insert 1. The holder 105 includes an insert pocket 103 on a front end. The cutting insert 1 is mounted to the insert pocket 103 with at least the front cutting edge 21 protruding from the front end of the holder 105, as illustrated in FIG. 13.

The holder 105 of the present embodiment has a slender, elongated rod shape. A direction in which the holder 105 is slenderly elongated matches the direction in which the central axis of the insert 1 elongates. Also, the front end of the holder 105 is provided with one insert pocket 103. The insert pocket 103 is a portion on which the insert 1 is mounted, and is opened to a front end surface of the holder 105.

The holder 105 has an upper jaw portion 107 that constrains the top side surface of the main body section of the insert 1, and a lower jaw portion 109 that constrains the bottom side surface of the main body section of the insert 1. The insert pocket 103 is defined by the region where the upper jaw portion 107 and the lower jaw portion 109 face. The main body section of the insert 1 is inserted and secured in the insert pocket 103, that is, between the upper jaw portion 107 and the lower jaw portion 109. In this case, the top side surface of the main body section contacts the upper jaw portion 107 of the holder 105. Also, the bottom side surface of the main body section contacts the lower jaw portion 109 of the holder 105.

The top side surface of the main body section has the top side groove portion. As such, a first protrusion that contacts the top side groove portion is disposed in a region of the upper jaw portion 107 that faces the lower jaw portion 109. Additionally, the bottom side surface of the main body section has the bottom side groove portion. As such, a second protrusion that contacts the bottom side groove portion is disposed in a region of the lower jaw portion 109 that faces the upper jaw portion 107.

In the present embodiment, the holder 105 has a first screw hole (not illustrated) formed in the upper jaw portion 107 and a second screw hole (not illustrated) formed in the lower jaw portion 109 beneath the first screw hole. A fixing screw 111 is inserted in these screw holes and, thereby, the insert 1 is secured to the holder 105. Specifically, the fixing screw 111 is inserted into the first screw hole formed in the upper jaw portion 107 and the front end of the fixing screw 111 is then inserted into the second screw hole formed in the lower jaw portion 109. Thus, the fixing screw 111 is screwed into the first screw hole and the second screw hole.

For the holder 105, it is possible to use steel, cast iron, or the like. In particular, it is preferable to use steel with a high toughness in these members.

Method for Manufacturing a Machined Product

Next, description will be given of a method for manufacturing a machined product of one embodiment of the present invention with reference to the drawings.

The machined product is manufactured by machining a work material 201. In the present embodiment, boring is given as an example of the machining. The method for manufacturing a machined product of the present embodiment includes the following steps. Specifically, it includes the steps of:

(1) rotating a work material 201;
(2) bringing at least the front cutting edge 21 of the cutting tool 101 exemplified in the above embodiment into contact with the work material 201 that is rotating; and
(3) separating the cutting tool 101 from the work material 201.

Figure 14:
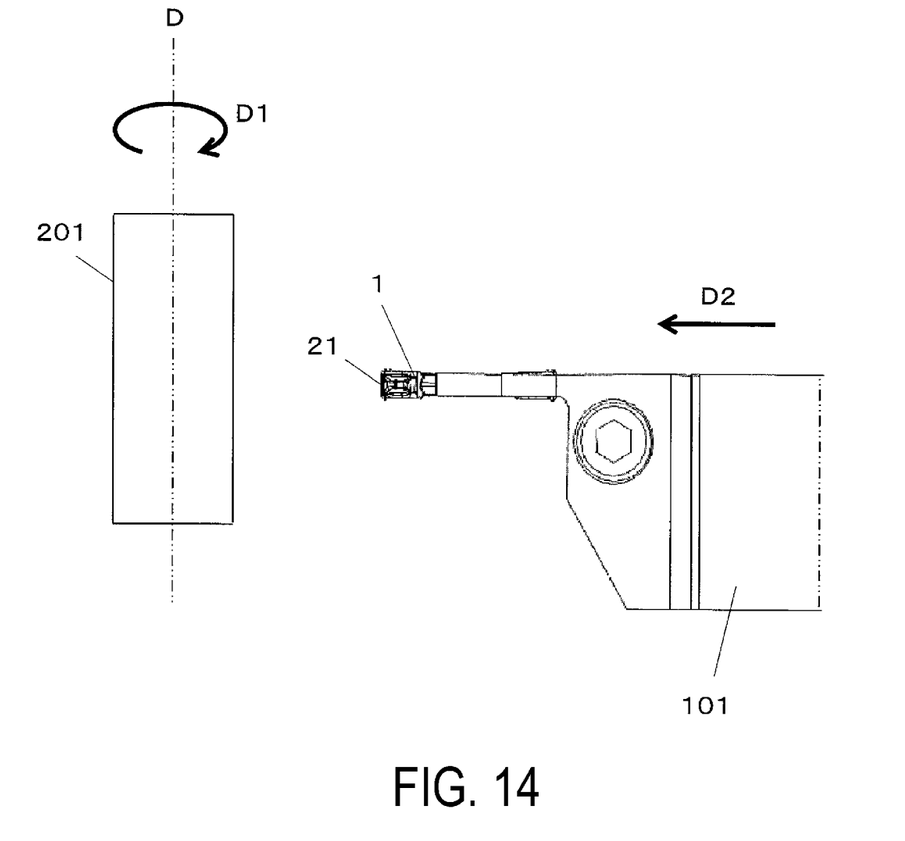
FIG. 14 is a schematic view illustrating one step of a method for manufacturing a machined product of one embodiment of the present invention.
Figure 15:
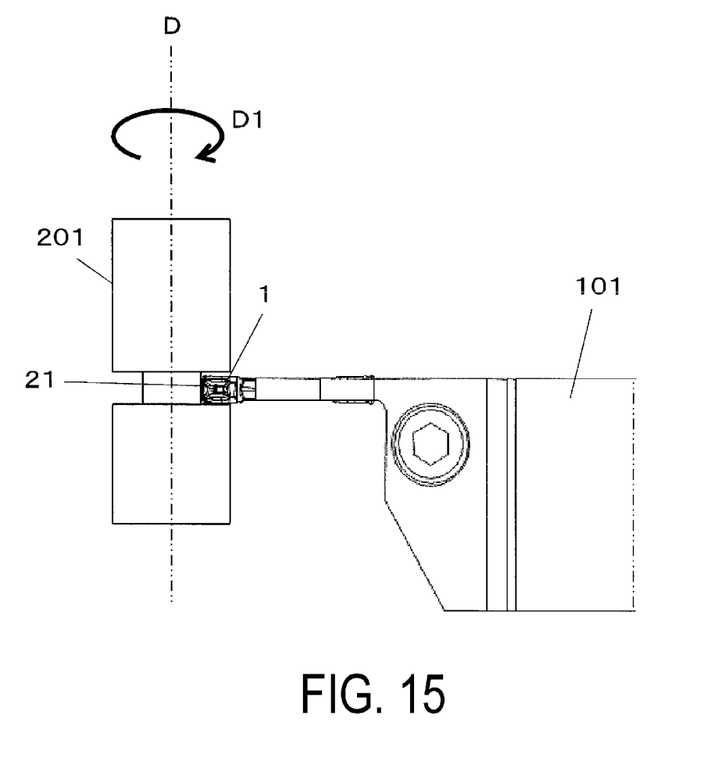
FIG. 15 is a schematic view illustrating one step of the method for manufacturing a machined product of one embodiment of the present invention.
Figure 16:
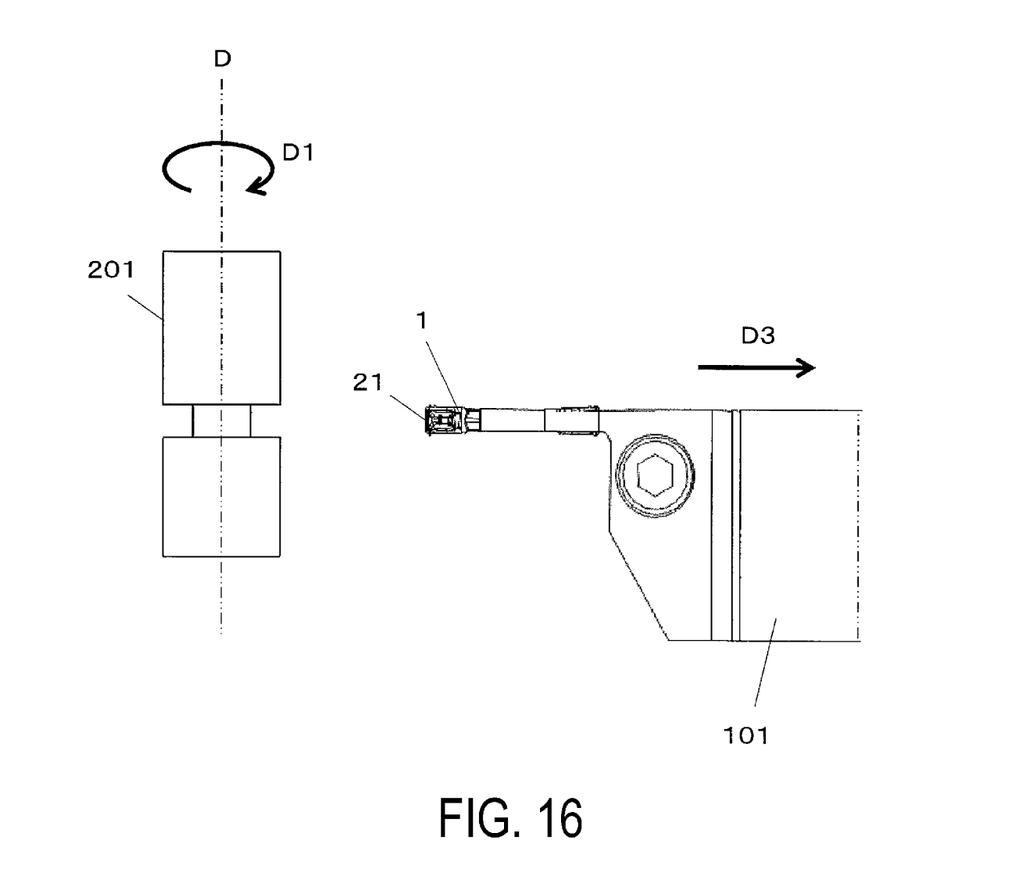
FIG. 16 is a schematic view illustrating one step of the method for manufacturing a machined product of one embodiment of the present invention.

More specifically, first, as illustrated in FIG. 14, the work material 201 is rotated in a D1 direction about an axis D. The cutting tool 101 is brought relatively close to the work material 201 by moving the cutting tool 101 in a D2 direction. Next, as illustrated in FIG. 15, the front cutting edge 21, the corner cutting edges, and the lateral cutting edges of the cutting tool 101 are brought into contact with the work material 201, and the work material 201 is cut. Then, as illustrated in FIG. 16, the cutting tool 101 is relatively moved away from the work material 201 by moving the cutting tool 101 in a D3 direction.

In the present embodiment, the cutting tool 101 is brought close to the work material 201 in a state where the axis D is fixed and the work material 201 is rotating. Furthermore, in FIG. 15, the work material 201 is cut by bringing the front cutting edge 21, the corner cutting edges, and the lateral cutting edges of the cutting insert 1 into contact with the work material 201 that is rotating. Furthermore, in FIG. 16, the cutting tool 101 is moved away from the work material 201 in a state where the work material 201 is rotating.

Further, in the machining of the manufacturing method of the present embodiment, in each of the respective steps, although the cutting tool 101 is brought into contact with or separated from the work material 201 by moving the cutting tool 101, the present embodiment is of course not limited to such a mode.

For example, in step (1), the work material 201 may be brought close to the cutting tool 101. In the same manner, in step (3), the work material 201 may be moved away from the cutting tool 101. In a case where the machining is to be continued, steps of bringing the cutting edges of the cutting insert 1 into contact with different positions on the work material 201 may be repeated by maintaining the rotating state of the cutting tool 101.

Here, representative examples of the material of the work material 201 include carbon steel, alloy steel, stainless steel, cast iron, non-ferrous metals, or the like.

REFERENCE SIGNS LIST

1 Cutting insert (Insert)
3 Main body section
5 Cutting section
7 Top side surface
7a Top side groove portion
9 Bottom side surface
11 Top surface
13 Bottom surface
15 Front side surface
17 Lateral side surface
19 Corner side surface
21 Front cutting edge
21a First section
21b Second section
21c Third section
23 Lateral cutting edge
25 Corner cutting edge
27 Upper region
27a First region
27b Second region
27c Third region
29 Lower region
31 Projecting portion
33 Recess portion
θ1 First inclination angle
θ2 Second inclination angle
θ3 Third inclination angle
101 Cutting tool
103 Insert pocket
105 Holder
107 Upper jaw portion
109 Lower jaw portion
111 Fixing screw
201 Work material

The invention claimed is:
1. A cutting insert comprising:
a main body section elongated in a direction from a rear end side to a front end side; and
a cutting section located at least at the front end side of the main body section and comprising:
a top surface;

a front side surface adjacent to the top surface on the front end side and inclined toward the rear end side as a distance from the top surface increases; and a front cutting edge disposed along a ridge line at an intersection between the top surface and the front side surface, and comprising, a first section, a pair of second sections sandwiching the first section therebetween, and a pair of third sections sandwiching the first section and the pair of second sections therebetween, wherein a portion of the pair of second sections is located above the first section and the pair of third sections, the front side surface comprises a first region located below the first section, a pair of second regions located below the pair of second sections, and a pair of third regions located below the pair of third sections, a second inclination angle of the pair of second regions is greater than a first inclination angle of the first region and a third inclination angle of the pair of third regions.

2. The cutting insert according to claim 1, wherein the first section has a downwardly curved shape in a front end view.

3. The cutting insert according to claim 2, wherein the pair of second sections each has an upwardly curved shape in a front end view.

4. The cutting insert according to claim 3, wherein the pair of third sections each has a downwardly curved shape in a front end view.

5. The cutting insert according to claim 1, wherein the lowest point of the first section is located below the pair of third sections.

6. The cutting insert according to claim 1, wherein the top surface comprises:

a pair of projecting portions extending from the pair of second sections on the front cutting edge toward the rear end side; and a recess portion located between the pair of projecting portions and extending from the first section on the front cutting edge toward the rear end side.

7. A cutting tool comprising:

a holder comprising an insert pocket on a front end thereof; and the cutting insert according to claim 1, that is mounted to the insert pocket with the front cutting edge protruding from the front end of the holder.

8. A method for manufacturing a machined product, the method comprising:

rotating a work material;

bringing the front cutting edge of the cutting tool according to claim 7 into contact with the work material that is rotating; and separating the cutting tool from the work material.

9. The cutting insert according to claim 5, wherein the third inclination angle is greater than the first inclination angle.

* * * * *